Sept. 10, 1963    E. A. I. JOHANSSON    3,103,048
BUCKLES FOR AUTOMOBILE SAFETY BELTS AND THE LIKE
Filed April 25, 1961
Fig. 1
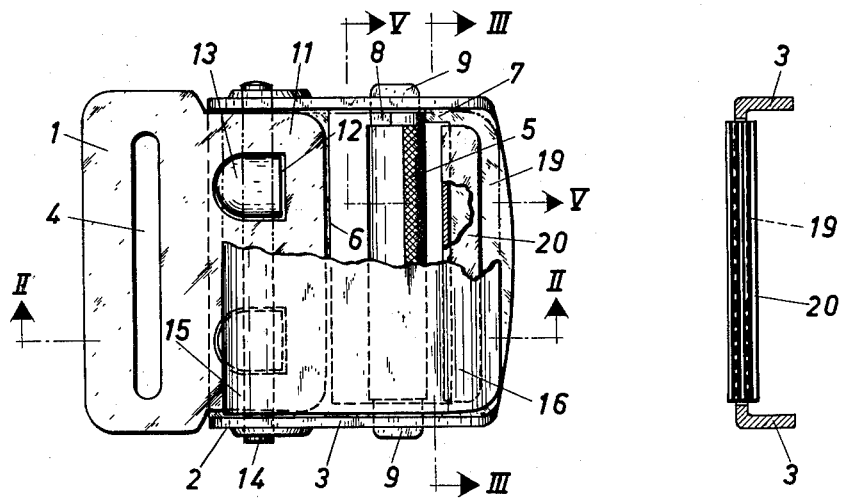
Fig. 3
Fig. 2
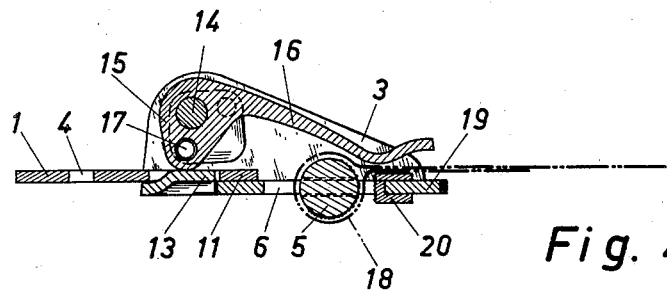
Fig. 4
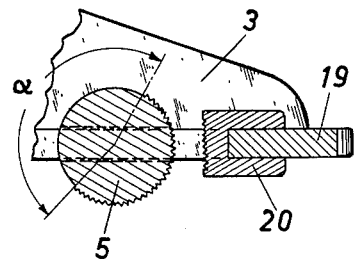
Fig. 5
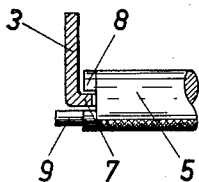
INVENTOR
EBBE ANDERS ISRAEL JOHANSSON
BY *Linton and Linton*
ATTORNEYS 3,103,048
BUCKLES FOR AUTOMOBILE SAFETY BELTS
AND THE LIKE
Ebbe Anders Israel Johansson, 6 Kaptensgatan,
Halmstad, Sweden
Filed Apr. 25, 1961, Ser. No. 105,333
1 Claim. (Cl. 24—75)

The present invention relates to safety belt or the like buckles of the kind comprising two fastening members each attached to one part of the belt and adapted to be detachably interconnected, one of said members comprising a substantially flat portion with a slot therein extending transversely relative to the direction of pull on said belt, a knurled adjustment roller being disposed in said slot displaceable in said pulling direction, one part of the belt being passed around said roller for clamping by said roller against a yoke-shaped end portion of said flat portion, when the belt is pulled.

Many safety belts are made of a material capable of stretching considerably when subjected to heavy stress. During such stretching, that portion of the belt which passes around the knurled roller is subject to heavy wear due to the rough surface of the roller.

It is an object of the present invention to overcome this drawback by providing the adjustment roller with knurling extending only over a portion of the roller periphery which substantially faces said yoke-shaped end portion, while the remaining portion of the roller periphery is smooth.

In buckles of the kind set forth above it is important that the fastening members are made of a material of such strength that the buckle will not break if the safety belt is subjected to heavy stress. However, the use of such material will involve the risk of deformation of the fastening members. If the yoke-shaped end portion of that fastening member which is provided with the adjustment roller becomes deformed, that part of the belt which is passed around the adjustment roller may be pressed against the yoke-shaped portion over very limited areas in such a manner that the belt may be cut through.

This drawback is overcome, according to the present invention, by the provision of a U-shaped reinforcement member of hardened steel secured to and embracing that edge portion of aforesaid yoke-shaped portion which faces aforesaid slot.

According to the invention that surface of the reinforcement member which faces the slot may preferably be provided with longitudinal, shallow grooves.

One embodiment of the invention is illustrated in the accompanying drawing in which:

FIGURE 1 is a partly broken view of a buckle made according to the invention with the two fastening members interconnected;

FIGURE 2 is a section taken on the line II—II in FIGURE 1;

FIGURE 3 is a section on the line III—III in FIGURE 1;

FIGURE 4 is an enlargement of part of FIGURE 2, and

FIGURE 5 is a section taken on the line V—V in FIGURE 1.

The buckle comprises a first fastening member 1 in the form of a plate and a second, substantially channel-shaped fastening member 2 with mutually parallel side portions 3. The fastening members 1 and 2 are intended to be secured to one end each of an automobile safety belt or the like. For this purpose the fastening member 1 is provided near one edge with a slot 4 parallel to said edge for receiving one end of the belt. The fastening member 2 is provided with a knurled adjustment roller 5 around which the other end of the belt is intended to be passed in a manner indicated in broken lines in FIGURE 2 and which permits the effective length of the belt to be adjusted in a manner known per se. The roller 5 is mounted for transverse displacement in a slot 6 in the flat bottom portion of the fastening member 2. Those edge portions 7 of said slot which are perpendicular to the longitudinal axis of the roller are embraced by tongues 8 and 9 formed in the end portions of the roller by means of slots therein. Those tongues 9 which are disposed outside of the channel-shaped fastening member extend past the side portions 3 of the channel, so that the roller may be easily grasped between forefinger and thumb for adjusting the length of the belt.

That end portion 11 of the plate 1 which is intended to be inserted into the channel-shaped fastening member 2 is provided with two holes 12 for receiving two shoulders 13 projecting from the bottom portion of the fastening member 2. Between the side portions 3 there is pivotally journalled by means of a shaft 14 an eccentric looking member 15 which is made integral with a handle portion 16 which in the locked position forms a cover or lid for the channel-shaped member 2. In the locking position the eccentric locking member 15 abuts against the plate 1, so that the plate will be prevented from being disengaged from the shoulders 13. The eccentric locking member 15 is provided at each end with a ball catch 17 (see FIGURE 2) adapted to co-operate with seats arranged in the side walls 3 of the fastening member 2 in order to retain the eccentric locking member 15 either in the locking position shown in the drawing or in an open position (not shown) to which the eccentric locking member 15 is moved by swinging the handle 16 counter-clockwise according to FIGURE 2.

When tension occurs in the belt portion 18 which passes around the adjustment roller 5 and which is indicated in FIGURE 2 in broken lines, the adjustment roller will be displaced towards a yoke-shaped end portion 19 of the flat bottom portion of the fastening member 2 which end portion forms one side of the slot 6, whereby the belt will become clamped between the adjustment roller 5 and that edge of said end portion 19 which faces said roller 5. A U-shaped reinforcement member 20 of hardened steel is pressed onto said edge of the member 19 and embraces said member with its leg portions. That surface of the reinforcement member 20 which faces the adjustment roller is preferably provided with longitudinal, shallow grooves as shown in FIGURES 2 and 3 to co-operate with the knurled adjustment roller for positively retaining the belt portion 18.

The reinforcement member 20 prevents deformation of the end portion 19, whereby the risk for cutting the safety belt is eliminated.

The material used in safety belts is frequently such, that the belts may be stretched up to 40% when subjected to heavy stresses. The belt portion 18 (FIGURE 3) passed around the adjustment roller 5 will slide relative to the adjustment roller 5 during such a stretching, so that the knurled surface of the roller may cause excessive wear of that side of the belt which faces the roller, so that the belt will be thus weakened. This drawback is greatly diminished according to the invention by providing the adjustment roller 5 with knurling only over that portion of its periphery which substantially faces the yoke-shaped portion 19, while the remaining portion of the roller 5 which faces away from said portion 19 is left smooth. This is illustrated in FIGURE 4 where the smooth portion of the circumference of the adjustment roller 5 is indicated by the angle α.

The invention is not limited to the embodiment hereinbefore described and as shown in the accompanying drawing, said embodiment being subjected to modifications with respect to its details without departure from the spirit of the invention.

What I claim is:

A safety belt buckle comprising a pair of fastening members each for being attached to one end of a belt and detachably connectable to one another, one of said members having a flat portion with a slot therein defined by a pair of sides one of which is serrated and extends transversely relative to the direction of pull on said belt and a pair of edges, a cylindrical adjustment bar for receiving an end portion of the belt therearound positioned in said slot extending transversely relative to the direction of pull on said belt, said slot edges being perpendicular to the longitudinal axis of said cylindrical adjustment bar, said cylindrical adjustment bar having a longitudinal slot provided in each end thereof forming a pair of spaced apart tongues on each end thereof with each slot edge slideably positioned between one of said pairs of tongues whereby said cylindrical adjustment bar can slide between said slot sides, but is retained against rotation, said cylindrical adjustment bar having knurling on the portion of the periphery thereof facing said slot serrated side and continuing around a bottom section of said bar in the direction of pull of the belt end portion therearound and a smooth portion extending from said knurled portion to substantially where the belt end leaves said bar whereby a pull on the belt will clamp the portion thereof around said bar between the knurled portion of said bar and the serrated side of said slot.

References Cited in the file of this patent
UNITED STATES PATENTS

| | | |
|---|---|---|
| 1,692,418 | Primak | Nov. 20, 1928 |
| 2,818,623 | Elsner | Jan. 7, 1958 |
| 2,876,516 | Cummings | Mar. 10, 1959 |